(12) United States Patent
Zabiego et al.

(10) Patent No.: US 9,620,251 B2
(45) Date of Patent: Apr. 11, 2017

(54) SOLID INTERFACE JOINT WITH OPEN PORES FOR NUCLEAR CONTROL ROD

(75) Inventors: Maxime Zabiego, Pierrevert (FR); Patrick David, Saint Cyr sur Loire (FR); Alain Ravenet, Vinon-sur-Verdon (FR); Denis Rochais, Saint-Avertin (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 817 days.

(21) Appl. No.: 13/704,587

(22) PCT Filed: Jun. 16, 2011

(86) PCT No.: PCT/EP2011/060001
§ 371 (c)(1),
(2), (4) Date: Feb. 13, 2013

(87) PCT Pub. No.: WO2011/157782
PCT Pub. Date: Dec. 22, 2011

(65) Prior Publication Data
US 2013/0208848 A1 Aug. 15, 2013

(30) Foreign Application Priority Data

Jun. 16, 2010 (FR) .................................... 10 54781

(51) Int. Cl.
*G21C 7/08* (2006.01)
*G21C 7/10* (2006.01)
*G21C 21/18* (2006.01)

(52) U.S. Cl.
CPC ............... *G21C 7/10* (2013.01); *G21C 7/08* (2013.01); *G21C 21/18* (2013.01); *Y02E 30/39* (2013.01)

(58) Field of Classification Search
USPC ......................................................... 376/327
See application file for complete search history.

(56) References Cited

U.S. PATENT DOCUMENTS 3,285,825 A 11/1966 Jens
3,969,186 A 7/1976 Thompson et al.
(Continued)

FOREIGN PATENT DOCUMENTS

CN 1189395 A 8/1998
CN 1281024 A 1/2001
(Continued)

OTHER PUBLICATIONS

International Search Report and Written Opinion in International Application No. PCT/EP2011/059999, mailed Sep. 26, 2011.
(Continued)

*Primary Examiner* — Sean P Burke
(74) *Attorney, Agent, or Firm* — Nixon Peabody, LLP; Khaled Shami

(57) ABSTRACT

A new interface between the cladding and the stack of pellets in a nuclear control rod. According to the invention, an interface joint made of a material transparent to neutrons, in the form of a structure with a high thermal conductivity and open pores, adapted to deform by compression across its thickness, is inserted between the cladding and the stack of pellets made of $B_4C$ neutron absorber material over at least the height of the stack. The invention also relates to associated production methods.

11 Claims, 1 Drawing Sheet

(56) References Cited

U.S. PATENT DOCUMENTS

| | | | |
|---|---|---|---|
| 4,172,762 A | | 10/1979 | Anthony et al. |
| 4,235,673 A | | 11/1980 | Mordarski |
| 4,759,911 A | * | 7/1988 | Bingham ............... G21C 3/042 |
| | | | 264/0.5 |
| 4,783,311 A | | 11/1988 | Ferrari |
| 4,818,477 A | | 4/1989 | Chubb |
| 5,946,367 A | * | 8/1999 | Maruyama ............... G21C 7/10 |
| | | | 376/285 |
| 6,246,740 B1 | * | 6/2001 | Maruyama ............ C04B 35/571 |
| | | | 376/327 |
| 2012/0207263 A1 | * | 8/2012 | Hiraoka ................... G21C 7/10 |
| | | | 376/327 |
| 2013/0163711 A1 | | 6/2013 | Zabiego et al. |

FOREIGN PATENT DOCUMENTS

| | | | |
|---|---|---|---|
| CN | 101495585 A | | 7/2009 |
| EP | 0 158 812 A1 | | 10/1985 |
| FR | 2 769 621 A1 | | 4/1999 |
| GB | 933091 | | 8/1963 |
| GB | 1187929 | | 4/1970 |
| JP | 52-79197 A | | 7/1977 |
| JP | 54-92299 U | | 6/1979 |
| JP | 58-189995 A | | 11/1983 |
| JP | 58-189995 U | | 12/1983 |
| JP | 2-140693 A | | 5/1990 |
| JP | 3-68895 A | | 3/1991 |
| JP | 5-172978 A | | 7/1993 |
| JP | 5-232289 A | | 9/1993 |
| JP | 08122476 A | * | 5/1996 |
| JP | 10-293199 A | | 11/1998 |
| JP | 11-174186 A | | 7/1999 |
| JP | 11-183674 A | | 7/1999 |
| JP | 2002-181978 A | | 6/2002 |
| JP | 2002-538473 A | | 11/2002 |
| JP | 2004061421 A | * | 2/2004 |
| JP | 2004-245677 A | | 9/2004 |
| JP | 2007-269621 A | | 10/2007 |
| JP | 2009-210266 A | | 9/2009 |
| JP | 2010-53278 A | | 3/2010 |
| JP | 2010-145235 A | | 7/2010 |
| WO | 2009/079068 A2 | | 6/2009 |
| WO | 2011/157780 A1 | | 12/2011 |

OTHER PUBLICATIONS

Preliminary Search Report in French Patent Application No. 1054781, dated Jan. 18, 2011.
International Search Report and Written Opinion in International Application No. PCT/EP2011/060001, mailed Oct. 4, 2011.
Preliminary Search Report in French Patent Application No. 1057692, dated Feb. 25, 2011.
S. Audisio, "Dépôts chimiques à partir d'une phase gazeuse (Chemical depositions starting from a gaseous phase)", Techniques de l'ingénieur, M1660, 2 pages, 1985.
Banhart, John, "Manufacture, characterisation and application of cellular metals and metal foams", Progress in Materials Science, vol. 46, Issue 6, pp. 559-632, 2001.
A. Berthet, B. Kaputsa, R. Traccucci, P. Combette, F. couvreur, D. Gouaillardou, J.C. Leroux, J. Royer & M. Trotabas, Pressurized Water Reactor Fuel Assembly, in the nuclear fuel of pressurized water reactors and fast reactors—Design and behaviour, (H. Bailly, D. Ménessier and C. Prunier, Editors), Lavoisier Publishing, Paris, pp. 271-436, 1999.
L. Caramaro, "Textiles à usages techniques (Fabrics for Engineering Applications)", Techniques de l'ingénieur N2511, 8 pages, 2006.
D. Gosset and P. Herter, "Matériaux absorbants neutroniques pour le pilotage des réacteurs (Neutron absorber materials for control of reactors)", Techniques de l'ingénieur B3720, 21 pages, 2007.
Y. Guerin, In-reactor behaviour of fuel materials, in the nuclear fuel of pressurized water reactors and fast reactors—Design and behaviour, (H. Bailly, D. Ménessier and C. Prunier, Editors), Lavoisier Publishing, Paris, pp. 77-158, 1999.
L. Kocon and T. Piquero, "Les aérogels et les structures alvéolaires : deux exemples de mousses de carbone (Aerogels and honeycomb structures: two examples of carbon foam)", L'Actualité Chimique, No. 295-296, pp. 119-123, 2006.
B. Kryger and J.M. Escleine, "Absorber elements", Chapter 7 in the nuclear fuel of pressurized water reactors and fast reactors—Design and behaviour, (H. Bailly, D. Ménessier and C. Prunier, Editors), Lavoisier Publishing, Paris, pp. 531-565, 1999.
Malo, J.Y. et al., "Gas Cooled Fast Reactor 2400 MWTh, status on the conceptual design studies and preliminary safety analysis", Proceedings of ICAPP'09, 10 pages, 2009.
Matthews, R. Bruce et al., "Uranium-Plutonium Carbide Fuel for Fast Breeder Reactors", Nuclear Technology, vol. 63, pp. 9-22, Oct. 1983.
Hj. Matzke, "Science of advanced LMFBR fuels", North Holland, Amsterdam, 1986.
P. Millet, J.L. Ratier, A. Ravenet and J. Truffert, Fast Reactor Fuel Subassembly, in the nuclear fuel of pressurized water reactors and fast reactors—Design and behaviour, (H. Bailly, D. Ménessier and C. Prunier, Editors), Lavoisier Publishing, Paris, pp. 437-529, 1999.
Design and construction rules for fuel assemblies of PWR nuclear power plants, AFCEN, 2005.
Office Action in U.S. Appl. No. 13/704,582, mailed Jun. 8, 2015.
Office Action in U.S. Appl. No. 13/704,582, mailed Nov. 13, 2015.
Tanaka, Kosuke et al., "Fission gas release and swelling in uranium—plutonium mixed nitride fuels", Journal of Nuclear Materials, vol. 327, pp. 77-87, May 2004.
Office Action in U.S. Appl. No. 13/704,582, mailed Oct. 26, 2016.

* cited by examiner

SOLID INTERFACE JOINT WITH OPEN PORES FOR NUCLEAR CONTROL ROD

CROSS REFERENCE TO RELATED APPLICATIONS or PRIORITY CLAIM

This application is a National Phase of PCT/EP2011/060001, filed Jun. 16, 2011, entitled, "SOLID INTERFACE JOINT WITH OPEN POROSITY, FOR NUCLEAR CONTROL ROD", which claims the benefit of French Patent Application No. 10 54781, filed Jun. 16, 2010, the contents of which are incorporated herein by reference in their entirety.

TECHNICAL DOMAIN

This invention relates to the interface between the stack of pellets and the cladding surrounding them, in a nuclear control rod used in a nuclear reactor.

Target applications for the invention include:

gas-cooled fast reactors (GFR) said to be generation IV reactors that operate with a coolant in the form of a gas such as pressurised helium, and use nuclear fuel rods with cladding made of a ceramic matrix composite (CMC) material, and mixed uranium and plutonium carbide type fuel pellets, [9];

fast neutron reactors operating with a sodium coolant (SFR) [12];

pressurised water reactors (PWR) [3] or boiling water reactors (BWR).

The invention relates to control rods for power reactors in which the pellets are made from a $B_4C$ neutron absorber material [8], [5].

Throughout this application, the term <<nuclear reactors>> has its normal meaning as understood at the present time, namely power plants for the generation of energy based on nuclear fission reactions using fuel elements in which fission reactions occur releasing thermal power, which is extracted from elements by heat exchange with a coolant fluid that cools them.

Throughout this application, <<Nuclear control rod>> (or <<absorber>>) has its official meaning as defined for example in the *Dictionnaire des Sciences et Techniques nucléaires* (Nuclear Sciences & Techniques Dictionary), namely a rod containing a neutron absorber material and that has an influence on the reactivity of a nuclear reactor depending on its position in the core.

PRIOR ART

There are different types of control rods depending on operating conditions and the performances of nuclear reactors.

The main functions to be performed by a nuclear control rod are to:

enable controlled absorption of neutrons by nuclear reactions, which imposes performance constraints (density of absorbing nuclei) and safety constraints (geometric stability necessary for control of the nuclear reactivity and cooling), guarantee controlled extraction of energy released by nuclear reactions, which imposes performance constraints (limitation of thermal barriers that could degrade transfers to the coolant) and safety constraints (integrity of the coolant channel, margin before melting of the absorber, limitation of temperature gradients that cause differential expansion that could lead to an excessive mechanical load on structures, etc.).

Absorbers conventionally encountered in nuclear installations may be classified as a function of their geometry as follows:

cylinders: rods in control rods, for example in FNR reactors or PWR reactors;

plates: for control rods, for example in Boiling Water Reactors (BWR).

The invention exclusively concerns nuclear control rods with cylindrical geometry and circular cross-section in which cylindrical $B_4C$ neutron absorber pellets with a circular cross-section are stacked in a sealed tubular cladding with a zone at one of its ends without any pellets called the expansion vessel, which accommodates elongation of the column of pellets under irradiation due to swelling phenomena induced by nuclear reactions. In this cylindrical configuration, there is an interface between the column of stacked pellets and the cladding. Up to now, this interface might be reduced during assembly to a contact surface only or it might correspond to a functional clearance that may then be composed of one or several materials in gas or liquid form or in layers, as explained below.

The inventors have made a list of functions to be performed by this interface in an absorbing element. They are described below.

Primary Functions:

f1/ manage mechanical decoupling between absorber pellets and the cladding, so as to limit mechanical interaction between pellets and the cladding (this interaction is hereinafter referred to as PCMI), by enabling free expansion of the column of stacked pellets along a radial direction and an axial direction;

f2/ enable transport of gas products derived from neutron absorption reactions (helium and tritium in the case of B4C pellets), released by the absorber as far as the expansion vessel located at the axial end of the control rod or at vents formed in the cladding of the control rod to release these gases into the primary system (from where they are then eliminated through special purpose purifying loops), f3/ manage thermal coupling between the absorber and the cladding:

i. minimising thermal barriers, particularly along the radial direction, to prevent any excessive temperature rise of the absorber;

ii. guaranteeing continuity of this function, particularly along the axial and azimuth directions, so as to minimise temperature heterogeneities that can cause differential expansion that could in particular induce large mechanical loads on the cladding.

Functions Induced by the Environment:

f4/ perform primary functions (f1 to f3) minimising the neutron impact at the interface, so as to preserve performances of the reactor core:

i. by minimising the geometric dimensions;

ii. by making use of materials that may have a large interaction cross-section with neutrons.

f5/ perform primary functions (f1 to f3) guaranteeing chemical compatibility of the interface with its environment:

i. guaranteeing chemical compatibility of the interface with the cladding (no increase in rates at high temperature, for example under accident condition);

ii. guaranteeing chemical compatibility of the interface with the absorber (no <<low temperature>> eutectic that could for example reduce the absorber melting margin).

Secondary Functions:

f6/ limit transfer of constituents from the absorber (particularly carbon for $B_4C$ pellets) to the cladding, to prevent the risk of internal corrosion that could cause embrittlement that might occur as a result of this transfer; this is a function related to the primary function f1;

f7/ optimise absorber/cladding centring so as to minimise temperature heterogeneities that cause hot points and increased mechanical loads at the cladding; this is a secondary function related to primary functions f1 and f3;

f8/ minimise (without introducing) the risk of the movement of absorber splinters into the clearance, if any, between the absorber and the cladding, that could cause an integrity defect in the cladding by ovalling and/or punching of the cladding when this clearance is reduced under the effect of differential strains (thermal expansion and swelling); this is a function related to the primary function f1. In the case of a control rod, functions f1 and f8 are possibly indissociable: unlike a fuel element, a control rod may have large radial dimensions (this is usually the case for FNRs but not necessarily for PWRs) that make a large pellet/cladding clearance necessary, which thus increases the risk that a pellet splinter could get trapped in this clearance, such that management of pellet splinters is a serious problem when attempting to maintain the integrity of the cladding under mechanical loads.

Auxiliary Functions:

f9/ satisfy usual economic constraints:

i. life: perform primary and secondary functions for an absorber operating time compatible with target economic performances;

ii. capacity for procurement of materials and implementation of fabrication methods;

iii. cost.

f10/ exclude any significant prejudice to safety in an accident condition (for example, chemical reactivity of the interface with structural materials in the core during an advanced core degradation phase);

f11/ minimise technical fabricability problems, particularly implementation of the absorber assembly process (absorber, interface and cladding);

f12/ satisfy separation and recycling requirements on the output side of the nuclear reaction cycle, with minimum constraints.

The interface between pellets and cladding in control rods with circular geometry and circular cross-section is in the form of a gas, typically helium or in the form of sodium for an SFR reactor, which has optimum properties (among possible gases) regarding thermal conductivity (function f3.i), chemical neutrality (function f5 and auxiliary functions (functions f9 to f12). Functions for mechanical decoupling between fuel pellets and cladding (function f1) and gas transport to the expansion vessel and/or any vents (function f2) are ideally performed by an interface in gas form, provided that a sufficient functional clearance is created during fabrication between pellets and cladding to prevent filling of the gap under irradiation due to differential strains of the absorber and the cladding [6].

However, a control rod with cylindrical geometry and a circular cross-section and an interface in gas form shows antagonism because it cannot perform firstly functions f1 and f2 and secondly functions f3.i and f4.i simultaneously, except within very strict performance limits. Beyond the dimensional constraints that adversely affect neutron performances (density of absorber material in the absorbing element), since the thermal conductivity of the gas interface is relatively mediocre, any increase in the functional clearance between pellets and the cladding during assembly will increase the thermal barrier that it forms, leading to increased temperatures of the absorber. Apart from the fact that the temperature increase takes place at the detriment of safety requirements (particularly a reduction in the absorber melting margin), it is accompanied by an increase in the three-dimensional expansion of the pellet that tends to reduce said gap under irradiation, thus reducing the efficiency of the increased thickness of the interface and consequently the increase in the life of the absorbing element.

One solution to reduce this thermal prejudice has been disclosed in patent JP 11183674 (applied to a fuel element, but in exactly the same way as is done elsewhere on control rods) and in which experiments have been made in various experimental irradiation programs [10], [11]. This solution consists of making the interface no longer in gas form but rather in the form of a metal with a low melting point and that is liquid under operating conditions of the fuel element, generally sodium. The conductivity of the metal is higher than that of gas and can thus considerably reduce problems related to conductance of the interface, which then makes a negligible contribution to the thermal balance of the fuel element/absorber and potentially makes greater interface thicknesses possible.

Another advantage of having an interface in liquid metal form is that it reduces circumferential thermal heterogeneity problems resulting from possible eccentricity of the fuel pellet/absorber relative to the cladding, due to its good thermal conductivity. The concentricity requirement (function f7) is not a priori guaranteed by an interface in gas or liquid metal form, due to the lack of rigidity of a liquid metal or a gas. Any eccentricity will also mean that the heat flux is heterogeneous around the circumference. The consequences of this thermal heterogeneity (hot point at the cladding and mechanical load induced by differential thermal strains) are thus attenuated when the interface is in the liquid metal form due to better heat transfers firstly between the liquid metal and the cladding and secondly between the liquid metal and the pellets.

However, the interface in liquid metal form cannot be made without creating some problems.

Firstly, compatibility with the environment (function f5, for example for chemical aspects), is found to be very restrictive. Thus in the case of sodium, that is naturally applicable for SFRs, there is clearly an incompatibility with a water coolant (PWR), and with a reactor operating at high temperature and consequently leading to an insufficient margin (or even non-existent margin, for example in the case of the GFR) against the risk of sodium boiling (sodium boils at a temperature of the order of 880° C.).

For example, concerning thermal heterogeneities (function f3.ii), it is clear that any discontinuity in the interface induced by the presence of gas bubbles in the liquid metal (bubbles formed during fabrication or by fission gases released under irradiation), would mitigate the thermal benefits of this solution: this problem was observed during experimental irradiation during which it was seen that it could lead to a premature end of life of the fuel element/absorber due to early failure of the cladding [11]. Furthermore, concerning the limitation of fuel/absorber constituent transfers (function f6), experimental irradiations of carbide fuels in SFR type reactors with the purpose of comparing the behaviour of helium and sodium interfaces have shown that the liquid metal contributes to embrittlement of the cladding due to carburization of the cladding induced by an increased transfer of carbon originating from fuel through the sodium, although this problem does not appear to arise through helium [11] unless there is pellet/cladding contact due to eccentricity. With a fuel control rod using a $B_4C$ absorber, a steel-based cladding and a sodium joint, there is a similar problem of embrittlement of the cladding due to decarburization of absorber pellets, migration of free carbon through the sodium path and thermochemical attack of the internal face of the cladding [8]. Finally, concerning function f8, the lack of inherent stiffness of the joint enables movement of fuel/absorber splinters which, if they move into the interface, could lead to ovalling or punching of the cladding by compression of the splinter between pellets and cladding during irradiation. Such punching implies a premature loss of the cladding integrity/seal safety function while ovalling will degrade performances because it affects heat exchanges and mechanical interactions, if any, between nearby fuel elements/absorbers. In practice, operating experience with irradiation of fuel elements shows that an initial value of the radial functional clearance between pellets and cladding of less than about 4% of the radius of pellets can minimize the risk of cladding failure by punching, by limiting the probability of a pellet splinter moving into the interface [13]. This limit, made necessary by safety requirements, nevertheless has proved to be relatively prejudicial to the operating life of the fuel element/absorber, in that it substantially reduces the operating life without PCMI. In this context, long term use of a fuel/absorber in a nuclear reactor, necessary for its economic performances, will make functioning with PCMI inevitable during a variable time period before the end of life. Very significant pellet/cladding clearances must be provided during fabrication of a $B_4C$ absorber characterised by a particularly high swelling ratio, in order to delay the PCMI; for example, typically more than 10% of the radius of pellets in SFR reactors, therefore more than the 4% mentioned above, which is particularly critical because the diameter of a control rod, at least in fast spectrum reactors, is potentially larger than the diameter of a fuel element; for example for SUPERPHENIX [8], the diameter of absorber pellets is 17.4 mm in comparison with the order of 7 mm for fuel pellets. Thus, there is a particularly severe risk of a pellet splinter moving into the pellet/cladding clearance, which is why a sleeve system has been developed to contain these splinters [8]. Various solutions have been proposed to enable acceptable operation with PCMI regarding economic and safety performances.

They are aimed at overcoming two residual difficulties that neither the interface in gas form nor the interface in liquid metal form can solve individually, namely:

the need to reduce the mechanical load imposed on the cladding in a situation of contact with the absorber, minimising embrittlement of the cladding due to thermochemical aggressions.

All proposed solutions consist of depositing one or several intermediate layers of materials, as all or part of the interface.

Patent GB 1187929 discloses the use of an intermediate layer between fuel pellets and the cladding, based on metal uranium, for a fuel rod with metal cladding operating at a temperature of at least 700° C. in an FNR reactor. This patent describes:

intimate contact between the intermediate layer and the cladding;

another part of the interface performing a temperature function, typically made of sodium, between the intermediate layer and the cladding;

an additional layer performing a chemical compatibility function, typically alumina, between the intermediate layer and the cladding;

grooves forming vacuum zones between the fuel and the intermediate layer;

the possibility that the porosity of the intermediate layer and/or the fuel pellet will be such that its (their) density will be equal to not more than 85% of its (their) theoretical density;

uranium alloy, or uranium and molybdenum alloy as constituents of the intermediate layer.

Similar solutions have been disclosed for fuel rods with zirconium-based cladding used in PWR reactors.

Thus, U.S. Pat. No. 4,818,477 discloses how to make a liner based on consumable neutron poisons (boride enriched in $^{10}B$), coating fuel pellets with a thickness of between 10 µm and 100 µm, so as to attenuate the PCMI.

U.S. Pat. No. 3,969,186 discloses how to make a metal liner deposited on the inner face of the cladding, so as to prevent the risk of perforation or failure of the cladding induced by stress corrosion cracking and/or pellets/cladding mechanical interaction.

U.S. Pat. No. 4,783,311 discloses how to make a combination of liners on the inner face of the cladding (thickness from 4 µm to 50 µm) and on the surface of fuel pellets (thickness from 10 µm to 200 µm), the liner on the inner face of the cladding, from a material such as graphite, particularly performing a <<lubricant>> role.

Patent JP 3068895A discloses how to make a ductile intermediate layer provided with grooves, to absorb stresses induced by a potential PCMI, the layer being plastically deformable thus avoiding propagation of cracks on the inner face of the cladding.

There are also fuel particles with a spherical geometry used in HTR reactors, as described in international patent application WO2009079068. As described in this application, a multilayer structure is made with a fuel ball at the centre and a surrounding cladding, providing mechanical integrity and a seal for fuel ball fission gases, and between which a porous pyrocarbon layer performing a buffer function is deposited in order to create an expansion volume for fission gases and the fuel ball.

Moreover, the problem raised by nuclear control rods with cylindrical geometry and circular cross-section already considered the movement of splinters of neutron absorber into the interface between pellets and cladding (function f8), as described in important operating experience on use of the $B_4C$ material in the SFR reactors [8]. The absorber pellet becomes fragmented under the effect of swelling induced by the production of helium by neutron absorption on $^{10}B$. It thus releases micro-fragments that fill in the interface between the pellets and the cladding and consequently accelerate PCMI, creating a mechanical load on the cladding that quickly leads to unacceptable damage. One solution that consists of placing absorber pellets in a thin metal sleeve has been used [8]: this solution confines pellet fragments (including in a sleeve failure condition) and thus prolongs the life of the control rod within given limits.

U.S. Pat. No. 4,235,673 discloses the use of a sleeve, either in the form of a fabric of metal wires (embodiment in FIGS. 1 and 2) or in the form of metal ribbons (embodiment in FIGS. 3 and 4), wound helically about the column of fuel pellets, fixed to closing elements at the ends of the column of fuel pellets and the sleeve being inserted between the column of fuel pellets and the cladding. This technological sleeve solution according to this U.S. Pat. No. 4,235,673 is aimed exclusively at confining pellet fragments or splinters that might be created. Thus, the only function of the sleeve according to this U.S. Pat. No. 4,235,673 is to confine fuel pellet splinters, and the function to transfer heat between the pellets and cladding is necessarily done by an infill fluid such as sodium as explained for example in column 4, lines 23-30 in this document and the function accommodating three-dimensional swelling of pellets is done through the compulsory existence of a functional clearance between the sleeve and cladding sized for this purpose, as is very clearly expressed in the text in claim 1 of this document. In other words, U.S. Pat. No. 4,235,673 discloses a necessarily composite interface solution between the sleeve fixed to the ends of the pellet column and a sufficiently large thickness of heat transfer liquid between the cladding and the pellet column to define a functional clearance sufficiently large to accommodate the three-dimensional swelling of the pellets. Furthermore, the combined interface solution according to this U.S. Pat. No. 4,235,673 is complex to implement and introduces risks of non-reproducibility, due to the sleeve being fixed to closing elements at the ends of the fuel pellet stack, which therefore requires an additional step during fabrication of a fuel rod in a nuclear environment. According to U.S. Pat. No. 4,235,673, this technical solution is applicable to nuclear control rods as shown in column 3, line 36.

Patent FR 2769621 discloses the use of a SiC sleeve reinforced with Sic fibres, inserted between a stack of typically $B_4C$ neutron absorber pellets, and the cladding. The solution according to this patent FR 2769621 cannot genuinely function: the material described for the sleeve is the equivalent of a ceramic matrix composite CMC. Studies done by the inventors show that such a composite cannot accommodate expansion or three-dimensional swelling of the stacked pellets in the long term. A CMC is intrinsically very stiff (Young's modulus of the order of 200 to 300 GPa) and its ductility is low (elongation at failure less than 1%) which quickly causes its destruction as soon as a mechanical interaction between pellets and cladding situation develops under the effect of three-dimensional swelling of the neutron absorber. Furthermore, the sleeve thicknesses mentioned in this patent FR 2769621 imply volume fractions of neutron absorber very much lower than allowable values. Reducing the volume fraction of absorber makes it necessary to increase the $^{10}B$ content, which has the disadvantage of high cost.

Patent JP 2004245677 discloses the use of a metal sleeve made from fibres, particularly a braid inserted between a stack of boron carbide $B_4C$ absorber pellets over its entire height. As for U.S. Pat. No. 4,235,673, this sleeve alone cannot perform all functions required for a pellet/cladding interface joint in a control rod: it acts essentially to confine fragments of absorber pellets (function f8), but it must also be associated with a filling fluid (liquid metal such as sodium mentioned in Patent JP 2004245677) in particular to satisfy the primary mechanical (function f1) and thermal (function f3) functions. Consequently, this solution hardly seems applicable to situations in which the proposed sleeve is immersed in sodium, which limits its use to SFR and appears to exclude its use for PWR or GFR for example, in so far as these reactors prohibit the use of sodium (problem of compatibility with the coolant in PWR and the boiling temperature in GFR).

Finally, U.S. Pat. No. 4,172,262 discloses the use of a metal sleeve inserted between the stack of neutron absorber pellets and the cladding, the sleeve being inserted only on the lower part of the stack. The specific material proposed in this document, namely 347 type stainless steel, is not compatible with very high temperatures and therefore makes it unsuitable for GFR reactors and in accident scenarios in other reactors.

Therefore, the general purpose of the invention is to propose an improved interface between pellets and cladding in a nuclear control rod with a cylindrical geometry and circular cross section that does not have the disadvantages of interfaces according to prior art as presented above.

Another purpose of the invention is to propose a method for fabricating a nuclear control rod with an improved pellet/cladding interface that is not completely unrelated to the industrial facility set up to fabricate existing nuclear control rods with circular cross-section.

PRESENTATION OF THE INVENTION

To achieve this, the purpose of the invention is a nuclear control rod extending along a longitudinal direction comprising a plurality of pellets made of a neutron absorber material, stacked on each other in the form of a column and cladding surrounding the column of pellets, in which the cladding and the pellets have a circular cross-section transverse to the longitudinal direction, and in which an interface joint also with a circular cross-section transverse to the longitudinal direction (XX'), made of a solid material transparent to neutrons and with open pores is inserted between the cladding and the column of stacked pellets, at least over the height of the column.

According to the invention, the interface joint is a structure, mechanically decoupled from the cladding and from the column of pellets, with a high thermal conductivity and open pores, adapted to deform by compression across its thickness so as to be compressed under the effect of the three-dimensional swelling of the pellets under irradiation, the initial thickness of the joint and its compression ratio being such that the mechanical load transmitted to the cladding by the pellets under irradiation remains less than a predetermined threshold value.

A high thermal conductivity means a coefficient of thermal conductivity sufficiently high to achieve heat transfer between the column of B4C absorber pellets and the cladding so as to guarantee that the core temperature in the absorber pellets remains below their melting point.

Therefore the invention concerns an interface joint between the stacked pellets and the cladding, the joint having a solid structure, high porosity preferably between 30 and 95% of the volume of the joint in the cold state and that is adapted to perform the following functions up to nominal operating temperatures in nuclear reactors:

due to its compression, enable radial expansion of the stacked neutron absorber pellets under irradiation, without any excessive mechanical load on the cladding;

due to deformations not causing loss of continuity of its structure, enable accommodation of differential axial strains between the stacked pellets and the cladding surrounding them, at a high temperature and under irradiation without an excessive load on the cladding;

facilitate transfer of heat generated by nuclear reactions within the pellets, to the coolant circulating along the cladding, in a uniform manner;

enable the transfer of gases released under irradiation (helium and tritium) to vents formed in the cladding and/or the expansion vessel located at the end of the cladding and in which there is no neutron absorber;

protect the cladding against compatibility problems with the absorber in the pellets by retention of products released by the absorber in the pellets that could corrode the cladding.

The interface joint according to the invention may be made in any nuclear control rod for use in reactors in which the coolant is either pressurised (as for GFR reactors) or is not pressurised. For pressurised coolants, care will be taken to assure that the cladding used is sufficiently resistant to creep deformation so that it will not come into contact with the fuel pellets during operation. Typically, cladding made of a ceramic matrix composite CMC is perfectly suitable.

A solid interface joint is defined with open pores that durably enable three-dimensional expansion of the $B_4C$ absorber pellets without applying an excessive mechanical load on the cladding, for irradiation durations that do not impose more severe shutdown constraints for reloading than shutdown constraints for fuel elements. "Excessive" means any load, particularly in the circumferential direction, that could exceed limits imposed by usual design criteria for a nuclear control rod [14]. Note also the thermal constraints (performance and lack of discontinuities) neutron constraints (neutron absorption capacity and dimensions) and constraints on the transfer of fission gases released to the expansion vessel also have to be respected.

One or more materials for the interface joint according to the invention could be used, that would contribute to making non-mechanical interactions between the absorber and the cladding material unimportant. Thus, the solid interface joint with open pores can trap some or all products released by the absorber that can react chemically with the cladding and degrade its mechanical performances (for example stress corrosion problem).

The open pores of the joint and any functional clearances separating the interface joint from the pellets and/or the cladding may be filled with a gas, preferably helium and/or a liquid metal such as sodium.

Due to is consistence (intrinsic stiffness up to the mechanical load threshold beyond which it starts to be compressed), the solid interface joint according to the invention guarantees centring of the pellets in the cladding and prevents any movement of $B_4C$ neutron absorber fragments.

One way of creating a long-term delay in the mechanical interaction between pellets and the cladding would be to envisage a solid interface joint several hundred microns thick. In any case, care will be taken to assure that its thermal properties, possibly taking account of the thermal properties of the gas and/or the liquid metal in which it is immersed, guarantee control of the temperature of the $B_4C$ neutron absorber.

Care will be taken to make sure that the solid interface joint has ad hoc mechanical properties. Thus, care will be taken to assure that it has sufficiently high strain capacities in compression, in other words radially along the direction of the control rod, and in shear (around the circumference and along the direction parallel to the axis of revolution of the fuel rod or the control rod), to accommodate differential strains of neutron absorber pellets and the cladding under irradiation, without inducing any excessive mechanical load on the cladding, or any axial and circumferential discontinuity of the joint. These mechanical properties must be guaranteed under irradiation for doses of up to the order of 100 dpa-Fe to 200 dpa-Fe (fluences from 2 to $4 \times 10^{27}$ $n/m^2$). Neutron absorber pellets are subject to three-dimensional swelling, such that their diameter and length increase. Since the cladding a priori swells much less than the absorber, the interface between pellets and the cladding reduces during irradiation. Furthermore, the stack of pellets extends much more than the cladding, causing longitudinal shear between them. Thus, care will be taken to assure that the interface joint can:

due to its compression strain, compensate for reduction of the interface with a stiffness compatible with the mechanical strength of the cladding, which excludes the presence of any locally dense zones (defects resulting from the fabrication method, densification in irradiation, etc.), compensate for the longitudinal sliding deformation between the neutron absorber stack and the cladding by its elongation (effect of Poisson's ratio) resulting from its radial compression and/or by shear deformation (assuming surface sticking on the cladding and/or the absorber with transmission of an axial force compatible with the mechanical strength of the cladding); and/or by a viscous axial extrusion flow into the gap under the action of its radial compression.

The interface joint according to the invention is made continuously over its entire height: in any case, the objective is to reach a compromise such that by compensating for the longitudinal sliding deformation described above, no axial discontinuity of the joint occurs.

Finally, care will be taken to assure that joint deformation modes do not cause fragmentation of the joint in a way that could lead to fragments moving when the interface is partially reopened, typically during an unscheduled or scheduled reactor shutdown, which would induce a risk of later punching of the cladding, for example when the power/temperature rise.

Care may also be taken to assure that the material(s) to be envisaged for the solid interface joint is (are) neutron absorber(s) as much as possible.

The high open porosity of the structure as fabricated must facilitate transport of released gases to vents (if any) formed in the cladding and/or the expansion vessel located near the top of the absorber element, with an efficiency that does not degrade much under irradiation (compression of the structure leading to a reduction in the total porosity and the open pores ratio).

The large exchange surface area provided by the structure must facilitate retention of products released by the absorber under irradiation (for example carbon in the case of the $B_4C$) that might contribute to embrittlement of the cladding by corrosion.

Due to the structural solid interface joint according to the invention, it can be thicker than is possible with interfaces usually encountered between the pellets and cladding, so as to extend the life of pellets made of a $B_4C$ neutron absorber material, resulting in an appreciable economic saving without affecting safety.

The open pores of the interface joint according to the invention may have a volume equal to at least 30% of the total volume of the interface joint as produced in fabrication. Preferably, this volume is between 30% and 95% of the total volume of the interface joint as produced in fabrication and is more preferably between 50% and 85%.

Obviously, the described porosity and geometric dimensions of the interface joint are those for the cold interface joint as produced in fabrication and before it is used in a nuclear reactor.

The same is true for other elements of the control rod according to the invention.

The open porosity targeted by the invention may be quantified by various known measurement techniques: for example density measurement for braids and fibres, or for example image analysis by X tomography or optical microscopy or optical macroscopy.

Advantageously, the thickness of the interface joint in its section transverse to the (XX') direction is more than at least 10% of the radius of the pellets.

The interface joint may be composed of one or several fibrous structures such as braid(s) and/or felt(s) and/or web(s) and/or fabric(s) and/or knit(s). Its volume percentage of fibres is then advantageously between 15 and 50%, which corresponds approximately to a porosity of between 50 and 85%, in other words an optimum compromise between the required joint compressibility and high thermal conductivity accompanied by effective confinement of any absorber splinters that might be formed.

According to one embodiment, the interface joint may be made from a braid comprising a plurality of carbon fibre layers and a plurality of layers comprising silicon carbide fibres superposed on carbon fibre layers.

Alternately, the interface joint may be made from one or several honeycomb materials such as foam.

The interface joint may be based on ceramic or metal.

For a gas-cooled fast reactor (GFR), the basic material of the cladding could preferably be envisaged to be a refractory ceramic matrix composite (CMC) such as SiC—SiC$_f$, possibly associated with a liner based on a refractory metal alloy.

For a sodium-cooled fast reactor (SFR), it would be preferable to envisage the cladding made of a metallic material.

Finally, the invention relates to a method for making a nuclear control rod comprising the following steps:

a/ at least partially make a joint with a circular cross-section made of a material transparent to neutrons, in the form of a structure made of a material with good thermal conductivity with open pores, capable of deforming under compression across its thickness;

b/ insert the at least partially produced joint into a cylindrical cladding with a circular cross-section that is open at least at one of its ends, made of material that may or may not be transparent to neutrons;

c/ insert a plurality of pellets made of boron carbide $B_4C$ neutron absorber material over not more than the height of the joint, inside the joint inserted into the cylindrical cladding with circular cross-section, d/ completely close the cladding once the joint has been entirely produced.

According to a first embodiment, step a/ is performed using the following sub-steps:

superpose a plurality of braid layers comprising silicon carbide fibres on a plurality of layers of carbon fibre braids themselves on a mandrel;

compress the multilayer braid in a cylindrical mould;

add a soluble binder into the compressed braid;

evaporate the solvent;

step b/ is performed using the mandrel around which the braid is in contact, the mandrel then being removed;

and later in step c/, a heat treatment is performed under a vacuum to eliminate the binder and thus bring the joint into contact with the plurality of stacked pellets and with the cladding.

The braid layers may be of the two-dimensional type with a braiding angle of 45° relative to the axis of the mandrel.

The carbon fibres may be of the Thornel® P-100 type, each containing 2000 filaments and cracked.

The silicon carbide fibres are of the HI-NICALON0™ type S each containing 500 filaments.

The soluble binder is advantageously a polyvinyl alcohol.

According to a second embodiment, step a/ is performed using the following sub-steps:

needlebonding of carbon fibre webs in the form of a tube on a mandrel;

performance of a heat treatment (for example at 3200° C. under Argon);

compression of the heat-treated tube in a cylindrical mould;

addition of soluble binder into the compressed tube;

evaporation of the solvent;

step b/ is performed using the mandrel around which the tube is in contact, the mandrel subsequently being removed;

and later in step c/, a heat treatment is performed under a vacuum to eliminate the binder and thus bring the joint into contact with the plurality of stacked pellets and with the cladding.

The carbon fibres may then be of the Thornel® P-25 type.

As in the first embodiment, the soluble binder is advantageously a polyvinyl alcohol.

According to a third embodiment, step a/ is performed using the following sub-steps:

production of a carbon foam tube composed of open honeycombs;

chemical vapour deposition (CVD) of a W—Re alloy on the carbon foam tube.

BRIEF DESCRIPTION OF THE DRAWINGS

Other advantages and characteristics of the invention will become clear after reading the detailed description of a nuclear control rod according to the invention with reference to FIGS. 1 and 1A below among which.

DETAILED DESCRIPTION OF PARTICULAR EMBODIMENTS

Figure 1:
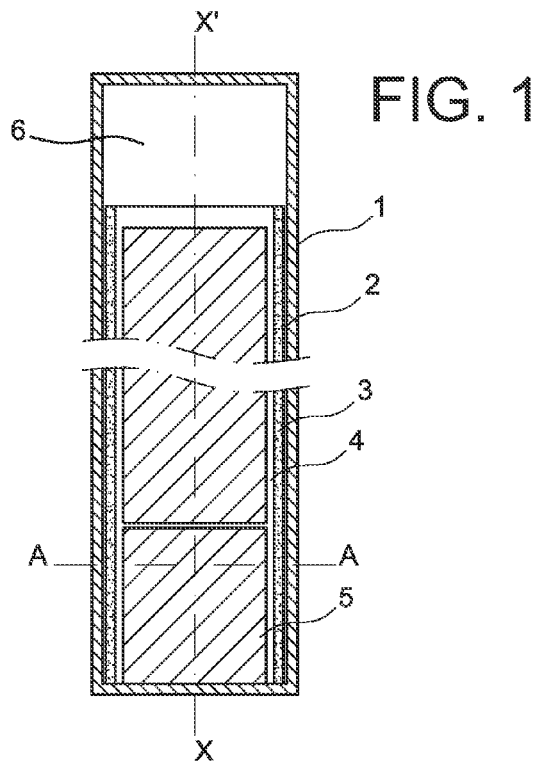
FIG. 1 is a partial longitudinal cross-sectional view of a nuclear control rod according to the invention.
Figure 1A:
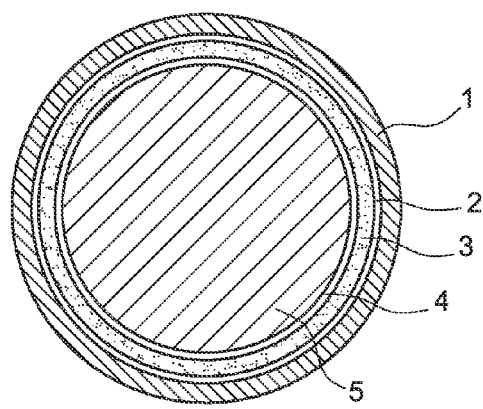
FIG. 1A is a cross-sectional view of the nuclear control rod according to FIG. 1.

Note that the element shown is a nuclear control rod. This element is shown cold, in other words once the final control rod has been fabricated and before use in a nuclear reactor.

The control rod according to the invention comprises the following from the outside to the inside:

cladding 1 made of a metallic or CMC (ceramic matrix composite) material(s), possibly coated with a liner on its internal wall, a first assembly set 2 (optional, to the extent that it may possibly be eliminated during fabrication following the binder evaporation process described above), a solid joint 3 with open pores according to the invention;

a second assembly set 4 (optional, to the extent that it can possibly be eliminated during fabrication following the binder evaporation process described above);

a stack of pellets 5 of neutron absorbing boron carbide $B_4C$ material forming a column.

The solid joint with open pores 3 according to the invention has a height greater than the height of the column of stacked pellets 5. The difference in height between the porous solid joint 3 and the column of stacked pellets is chosen to assure that this column remains axially facing the joint throughout the irradiation phase during operation of the nuclear reactor during which its length increases due to swelling under irradiation. Thus according to [8], the absorber in the SUPERPHENIX reactor targets functioning with $10^{22}$ captures per $cm^3$ of absorber and per year, and the elongation rate due to swelling of $B_4C$ is of the order of 0.05% for $10^{20}$ captures per $cm^3$ of absorber, giving an elongation of the order of 5% per year of irradiation.

Several types of materials may be suitable for fabrication of the porous solid joint 3 according to the invention, and advantageously fibrous structures possibly with a matrix deposited in these structures, or honeycomb materials with open pores.

Fibrous structures that may be suitable include braids, felts, webs, fabrics or knits, or a combination of them, comprising a volume percentage of fibres equal to at least 15%, or possibly at least 5% in the case of felts, before densification. The fibres may be made of ceramic compounds (carbon, carbides, nitrides or oxides) or metallic compounds (such as W, W—Re alloys, Mo—$Si_2$, etc.). One way of making fibrous structures suitable for a porous joint 3 according to the invention may be to use conventional braiding, felt forming techniques or webbing, needlebonding, weaving or knitting [4].

It is possible to envisage increasing the thermal conductivity of the material or protecting the fibres by depositing chemical compounds that are also refractory (ceramic or metallic compounds) on the fibres. These depositions then represent a volume percentage such that the open porosity of the final material, fibrous structure reinforced by a deposit, is between 30% and 85%, or even up to 95% in the case of felts. These depositions on fibrous structures may be made using conventional chemical vapour deposition (CVD) techniques [1] or other techniques such as impregnation of ceramic polymer precursor, pyrolysis, etc.

The joint 3 may be placed either by positioning it around the pellets 5 and then inserting the joint 3/pellets 5 assembly into the cladding 1, or by inserting it into the cladding 1, the pellets then being inserted later.

Physical contact firstly between the cladding 1 and the joint 3 and secondly between the joint 3 and the pellets 5 may be formed during the temperature rise in the nuclear reactor by differential thermal expansion, since joint 3 expands more. Another way of achieving this physical contact is radial compression of the joint 3, and then the joint 3 can be released after placement of the cladding 1-joint 3-pellets 5 assembly, before the assembly is put into service in the nuclear reactor for which the control rod is to be used.

Honeycomb materials or foams that might be suitable are open pore materials with between 30% and 85% of porosity, with cell diameters preferably less than 100 μm to prevent movement of "macro-fragments" of pellets, but sufficiently high for interconnection of the pores. The composition of these materials may be based on ceramic or metallic compounds. It would be possible to make honeycomb materials suitable for porous joints 3 according to the invention using conventional techniques for the injection of gas bubbles or compounds generating bubbles in the molten material or a precursor compound (organic resin for carbon), powder metallurgy with porogenic compounds or particles, deposition of a compound on a foam acting as a substrate [2],[7]. The basic foam can then be reinforced by deposition of a compound (among ceramic or metallic compounds) with a nature that may be identical to or different from the foam compound. This deposition may for example be obtained by chemical vapour deposition (CVD) [1].

Three examples of nuclear control rods according to the invention are given below, with the characteristics of the main control system (SCP) for the SUPERPHENIX reactor [8]: in all these examples, the control rod comprises a stack of cylindrical boron carbide neutron absorber pellets 5 with a diameter of 17.4 mm and cladding 1 surrounding the column of stacked pellets with an inside diameter of 19.8 mm, namely a radial pellet/cladding clearance of 1.2 mm (cold).

For comparison with the joint solution that will be presented below, for an SCP control rod for the SUPERPHENIX reactor [8], the absorber pellets column is surrounded by a 200 μm thick liner confining pellet fragments formed under irradiation, and the residual pellet/cladding space is filled with liquid sodium to provide efficient heat transfer. The end of life of such a control rod is associated particularly with the occurrence of a mechanical interaction between pellets and the cladding situation, when the three-dimensional expansion of $B_4C$ pellets eventually fills in the free radial space that initially separated the column of pellets from the cladding, leading to a mechanical load that quickly makes the cladding unusable. The thickness of the liner (200 μm) should be naturally subtracted from the initial value of the pellet/cladding clearance (1.2 mm), therefore the allowable future expansion of the pellets is of the order of 1 mm for a pellet radius of 8.7 mm, which gives an allowable expansion ratio of the order of 11.5% before the mechanical interaction between pellets and the cladding is reached. These characteristics are usually sufficient to achieve neutron capture ratios of the order of $200*10^{20}$ per $cm^3$ of absorber.

With a porous solid joint according to the invention, and considering the end of life reached for complete disappearance of the joint porosity (by compression under three-dimensional expansion of $B_4C$ pellets), the gain on the neutron absorption ratio that could be envisaged from the design fabrication porosity for the joint according to the invention can be evaluated. For changing from a 200 μm thick liner to a 1.2 mm thick joint, the required value of the joint porosity is typically a value equal to a ratio of 1/1.2, namely of the order of 83% (joint with 17% of the theoretical density of the material of which it is composed), to achieve the capture ratio obtained with a sleeve type solution and also to benefit from the advantage of centring the pellets in the cladding. Note that the thermal effect induced by the joint is neglected (calculations show that this is a second order effect concerning the swelling ratio of the absorber).

Example 1

Braid with SiC Layers/C Layers

A first series of three layers of superposed braids is made with carbon fibres (trade name Thornel® P-100 each containing 2000 filaments and that are cracked to reduce the thread diameter) on a mandrel with the following characteristics:
inside diameter: 17.5 mm
outside diameter: 19.0 mm
braiding type: 2D
braiding angle: 45°
A second series of three braid layers is made on the previous series of braid layers with silicon carbide fibres (trade name HI-NICALON™ type S, each containing 500 filaments), with the following characteristics:
inside diameter: 19.0 mm,
outside diameter: 21.2 mm
braiding type: 2D
braiding angle 45°
The multi-layer braid 3 thus formed is compressed in a cylindrical mould with an inside diameter of 19.7 mm. An eliminable soluble binder, in this case a polyvinyl alcohol, is then added into the braid and the solvent is then evaporated.

The braid 3 is then stripped and inserted into a metal cladding 1 with inside diameter of 19.8 mm. The central mandrel is then removed, and a column of 17.4 mm diameter boron carbide $B_4C$ neutron absorber pellets 5 is then inserted into the braid. The binder is eliminated by heat treatment of the assembly under a vacuum. The braid 3 then expands and comes into physical contact with the pellets 5 and the cladding 1.

Therefore, the fabricated thickness of the braid 3 is equal to the total assembly clearance between the cladding 1 and the pellets 5, namely 1.2 mm.

The cladding 1 may then be closed at its ends, for example by welding. Even if not shown, before the final closing step is performed, a helical compression spring is housed in the expansion chamber or vessel 6 with its lower end bearing in contact with the stack of pellets 5 and its other end bearing in contact with the upper plug. The main functions of this spring are to hold the stack of pellets 5 along the direction of the longitudinal axis XX' and to absorb the elongation of the fuel column with time under the effect of longitudinal swelling of the pellets 5.

The nuclear control rod thus made with a porous solid joint 3 according to the invention can then be used for application in a fast neutron nuclear reactor.

Example 2

Carbon Needlebonded Structure

Carbon fibre layers (trade name Thornel® P-25) are needlebonded in the form of a tube with inside diameter 17.5 mm and outside diameter 21.2 mm, on a graphite mandrel.

A heat treatment is then applied on the assembly at 3200° C. under Argon. The tube thus formed is compressed in a cylindrical mould with an inside diameter of 19.7 mm. An eliminable soluble binder, in this case a polyvinyl alcohol, is then added into the structure and the solvent is then evaporated.

The porous solid joint 3 thus obtained is then stripped and inserted into a cladding 1 with inside diameter of 19.8 mm. The central mandrel is then removed, and a column of 17.4 mm diameter boron carbide $B_4C$ neutron absorber pellets 5 is then inserted into the mixed joint 3/cladding 1 structure.

The binder is then eliminated by heat treatment of the assembly under a vacuum. The joint 3 then expands and comes into contact with the stacked pellets 5 and the cladding 1.

The cladding 1 may then be closed at its ends, for example by welding. Even if not shown, before the final closing step is performed, a helical compression spring is housed in the expansion chamber or vessel 6 with its lower end bearing in contact with the stack of pellets 5 and its other end bearing in contact with the upper plug. The main functions of this spring are to hold the stack of pellets 5 along the direction of the longitudinal axis XX' and to absorb the elongation of the fuel column with time under the effect of longitudinal swelling of the pellets 5. The nuclear control rod thus made with a porous solid joint 3 according to the invention can then be used for application in a fast neutron nuclear reactor.

Example 3

Carbon Foam Coated with a W—Re 5% Alloy

A tube with an inside diameter of 17.4 mm and outside diameter of 19.8 mm made of carbon foam composed of 40 µm diameter open honeycombs is placed in a chemical vapour deposition (CVD) furnace.

An approximately 7 µm thick deposition of W—Re 5% alloy obtained from the decomposition of a mix of tungsten and rhenium halide compounds is applied on the ligaments forming the foam.

This foam tube is then inserted into the cladding 1 with inside diameter 19.8 mm, and the column of 17.4 mm diameter boron carbide $B_4C$ neutron absorber pellets 5 is in turn inserted into the foam tube.

The cladding 1 may then be closed at its ends, for example by welding. Even if not shown, before the final closing step is performed, a helical compression spring is housed in the expansion chamber or vessel 6 with its lower end bearing in contact with the stack of pellets 5 and its other end bearing in contact with the upper plug. The main functions of this spring are to hold the stack of pellets 5 along the direction of the longitudinal axis XX' and to absorb the elongation of the fuel column with time under the effect of longitudinal swelling of the pellets 5. The nuclear control rod thus made with a porous solid joint 3 according to the invention can then be used for application in a fast neutron nuclear reactor.

Other improvements would be possible without going outside the scope of the invention. Thus, in all examples 1 to 3 mentioned above, the fabrication thickness of the porous solid joint 3, in other words the thickness after the cladding 1 has been closed and the control rod is ready for application, is equal to the total design assembly clearance between the cladding 1 and the column of pellets 5 made of $B_4C$ neutron absorber material.

Obviously, clearances could be provided (see references 2, 4 in FIG. 1) that are maintained once the control rod is ready, provided that the fabrication methods and properties (particularly differential thermal expansion firstly of the cladding 1 and the porous solid joint 3, and secondly of the joint 3 and the pellets 5) make it possible.

These clearances as shown in references 2, 4 in FIG. 1 are a priori filled with a gas or a liquid metal that then naturally occupies the open pores of the porous solid joint 3 according to the invention, and the open pores of the $B_4C$ neutron absorber pellets 5.

But according to the invention and unlike solutions according to the state of the art, and more particularly the solution according to U.S. Pat. No. 4,235,673, assembly clearances are not essential and therefore are not functional clearances provided to accommodate the three-dimensional swelling of the pellets under irradiation.

Furthermore, the mandrel used to form the porous solid joint as in the examples described may be made of different materials compatible with the materials used in the joint, such as graphite and quartz.

Similarly, for the final step in the process before the cladding is closed, examples 1 to 3 describe placement of a helical compression spring. More generally, during this final step before the actual closing step of the cladding, it would be possible to use what is currently referred to as an "internals system" in the nuclear domain, in other words an assembly of components such as springs, packing, etc., the function of which is to position the column of pellets axially within the cladding.

Figure 2:
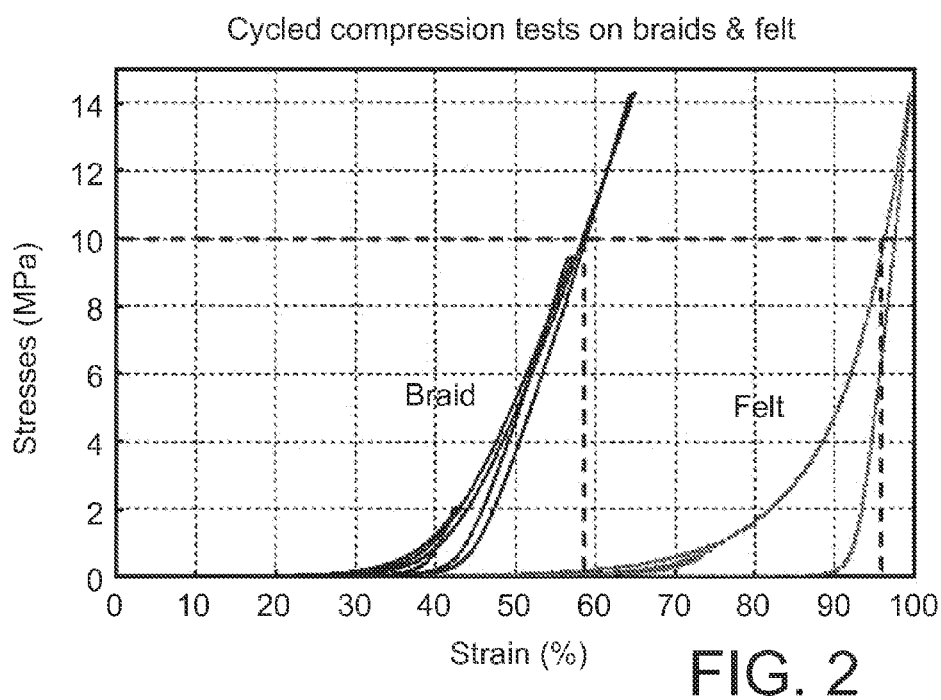
FIG. 2 shows cyclic compression tests of an interface joint according to the invention in the form of curves, this load mode being representative of operation under irradiation in a nuclear reactor (non-stationary due to power variations).

FIG. 2 shows the compression behaviour of interface joints according to the invention with high open porosity and based on braids or based on felt made of a SiC material.

More precisely, as shown, these are tests in cycled compression, with each cycle alternating a load and an unload, which in FIG. 2 is illustrated by loading loops in the strain-stress plane.

The abscissa indicates the values of the compression ratio (strain in %) of the joint across its thickness.

The ordinate indicates values of mechanical loads (stress in MPa) transferred by the joint under the effect of its compression.

Thus, the indicated stresses actually correspond to the radial mechanical load $\sigma_r$ applied to the cladding of a nuclear control rod under the effect of the three-dimensional swelling of $B_4C$ neutron absorber pellets stacked on each other, the stresses being transmitted to the cladding directly by compression of the joint between the pellets and the cladding. This radial load introduces a controlling circumferential load $\sigma_\theta$, the intensity of which corresponds to the intensity of the radial load to which a multiplication factor is applied, which is approximately equal to the ratio of the average radius $r_G$ of the cladding to its thickness $e_G$, which is typically equal to 5 to 10: $\sigma_\theta \approx (r_G/e_G)\sigma_r$.

FIG. 2 thus illustrates the fact that an interface joint according to the invention is adapted to function like a stress absorber: the transmitted load only becomes significant for a sufficiently high compression ratio beyond which the transmitted load increases progressively with the compression ratio, until it reaches the threshold value of the allowable limiting load (without any sudden changes). Thus, for a load $\sigma_r$ considered to be significant starting from 1 MPa, the compression ratio is of the order of 40% and 70% respectively for the braid and felt type joints considered in FIG. 2.

In a situation of operation under irradiation in a reactor, the cladding of a nuclear control rod cannot resist a mechanical load from $B_4C$ neutron absorbers unless it remains below a limit guaranteeing that there is no cladding failure. Thus, for example if the threshold value of the allowable circumferential load $\sigma_\theta$ is fixed at 100 MPa (which is a reasonable value considering usually allowed loads), namely a radial load $\theta_r$ of the order of 10 MPa (for a ratio $r_G/e_G$ of the order of 10), FIG. 2 shows that braid and felt type joints considered will give a compression ratio of the order of 60% and 95% respectively, below which the mechanical load transmitted to the cladding remains acceptable.

Note that the tests done according to FIG. 2 showed that the interface joint according to the invention based on braids and the joint based on felt maintained their integrity; thus, the braid/felt structure is preserved without any formation of fragments that could move into a reopened gap between pellets and the cladding in a control rod in a fast neutron reactor FNR.

A control rod must be kept for as long as possible in a fast neutron reactor if economic performances are to be optimised. These performances are usually limited by various operating constraints so as to satisfy safety objectives. One of the most severe constraints is imposed by the need to guarantee mechanical integrity of the control rod cladding under all circumstances. This leads to the definition of an allowable limiting load on the cladding (stress and/or strain beyond which the integrity of the cladding can no longer be guaranteed). However under irradiation, the $B_4C$ neutron absorber pellets are affected by a continuous three-dimensional swelling that leads to a pellet/cladding mechanical interaction (PCMI) that could eventually lead to an unacceptable load on the cladding. Therefore, the operating life for a nuclear control rod with $B_4C$ nuclear absorbers is strongly dependent on the time for such an excessive interaction to occur. The interface joint according to the invention as defined above provides a satisfactory response because it enables long term expansion or three-dimensional swelling of the pellets. For a fixed three-dimensional swelling of the pellets, the durability depends on the initial thickness of the joint and the compression ratio that it can accommodate before its compression state causes the transmission of an unacceptable mechanical load to the cladding; the initial thickness of the joint to be installed reduces as the allowable compression ratio increases.

FIG. 2 illustrates the fact that very high compression ratios are necessary to reach the compression limit of the proposed braid or felt type joints, which means that increased irradiation times can be reached if a reasonably thick joint is installed. The large joint thicknesses characteristic of control rods for a fast spectrum reactor, support the installation of high porosity joints that can easily reach and probably exceed the performances of the sleeve type solution used in SUPERPHENIX.

Furthermore, shear tests were carried out by imposing forces on an approximately 1 cm thick fibrous structure according to the invention, corresponding to cyclic displacements of the order of 100 μm at temperatures of the order of 400° C. For these elongations of 1%, the fibrous structure remained perfectly intact. In the case of control rods for fast spectrum reactors, the large thicknesses of the joints also enable the use of joints according to the invention comprising several layers of superposed braids and/or felts. Concerning the axial shear to which the joint under irradiation is submitted, due to the elongation of the column of pellets (effect of swelling) that is more pronounced than the elongation of the cladding, this multi-layer structure reduces the mechanical load on the joint by enabling relative sliding of layers on each other, and consequently limits the risk that the joint would be damaged by shear.

REFERENCES MENTIONED

[1] S. Audisio, *Dépôts chimiques à partir d'une phase gazeuse* (Chemical depositions starting from a gaseous phase), Techniques de l'ingénieur, M1660, 1985.

[2] J. Banhart, *Manufacture, characterisation and application of cellular metals and metal foams*, Progress in Materials Science, Vol. 46, pp. 559-632, 2001.

[3] A. Berthet, B. Kaputsa, R. Traccucci, P. Combette, F. couvreur, D. Gouaillardou, J. C. Leroux, J. Royer & M. Trotabas, *Pressurized Water Reactor Fuel Assembly*, in The nuclear fuel of pressurized water reactors and fast reactors—Design and behaviour, (H. Bailly, D. Menessier and C. Prunier, Editors), Lavoisier Publishing, Paris, pp. 271-436, 1999.

[4] L. Caramaro, *Textiles à usages techniques* (Fabrics for Engineering Applications), Techniques de l'ingénieur N2511, 2006.

[5] D. Gosset and P. Herter, *Matériaux absorbants neutroniques pour le pilotage des reacteurs* (Neutron absorber materials for control of reactors), Techniques de l'ingénieur B3720, 2007.

[6] Y. Guérin, *In-reactor behaviour of fuel materials*, in The nuclear fuel of pressurized water reactors and fast reactors—Design and behaviour, (H. Bailly, D. Menessier and C. Prunier, Editors), Lavoisier Publishing, Paris, pp. 77-158, 1999.

[7] L. Kocon and T. Piquero, *Les aérogels et les structures alveolaires: deux examples de mousses de carbone* (Aerogels and honeycomb structures: two examples of carbon foam), L'Actualité Chimique, No. 295-296, pp. 119-123, 2006.

[8] B. Kryger & J. M. Escleine, *Absorber elements*, in The nuclear fuel of pressurized water reactors and fast reactors—Design and behaviour, (H. Bailly, D. Menessier and C. Prunier, Editors), Lavoisier Publishing, Paris, pp. 531-565, 1999.

[9] J. Y. Malo, N. Alpy, F. Bentivoglio, F. Bertrand, L. Cachon, G. Geffraye, D. Haubensack, A. Messié, F. Morin, Y. Péneliau, F. Pra, D. Plancq & P. Richard, *Gas Cooled Fast Reactor* 2400 *MWTh, status on the conceptual design studies and preliminary safety* analysis, Proceedings of the ICAPP'09 conference, (Tokyo, Japan, May 10-14, 2009).

[10] R. B. Matthews and R. J. Herbst, Nuclear Technology, Vol. 63, pp. 9-22, 1983.

[11] Hj. Matzke, *Science of advanced LMFBR fuels*, North Holland, Amsterdam, 1986.

[12] P. Millet, J. L. Ratier, A. Ravenet and J. Truffert, *Fast Reactor Fuel Subassembly, in The nuclear fuel of pressurized water reactors and fast reactors—Design and behaviour*, (H. Bailly, D. Ménessier and C. Prunier, Editors), Lavoisier Publishing, Paris, pp. 437-529, 1999.

[13] K. Tanaka, K. Maeda, K. Katsuyama, M. Inoue, T. Iwai and Y. Arai, Journal of Nuclear Materials, Vol. 327, pp. 77-87, 2004.

[14] *Design and construction rules for fuel assemblies of PWR nuclear power plants*, AFCEN, 2005.

The invention claimed is:

1. A nuclear control rod extending along a longitudinal direction (XX'), comprising a plurality of pellets, made of boron carbide $B_4C$ neutron absorber material, stacked on each other in the form of a column and a cladding surrounding the column of pellets, in which, the cladding and the pellets have a circular cross-section transverse to the longitudinal direction (XX'), and in which an interface joint, also with a circular cross-section transverse to the longitudinal direction (XX'), made of a material transparent to neutrons and is inserted between the cladding and the column of stacked pellets, at least over the height of the column, in which the interface joint is a structure, mechanically decoupled from the cladding and from the column of pellets, with a high thermal conductivity and open pores, adapted to deform by compression across its thickness so as to be compressed under the effect of the three-dimensional swelling of the pellets under irradiation, the initial thickness of the joint and its compression ratio being such that the mechanical load transmitted to the cladding by the pellets under irradiation remains less than a predetermined threshold value characterized in that the interface joint is made from a braid comprising a plurality of carbon fibre layers and a plurality of layers comprising silicon carbide fibres superposed on the carbon fibre layers.

2. The nuclear control rod according to claim 1, in which the open pores of the interface joint have a volume equal to at least 30% of the total volume of the interface joint as produced in fabrication.

3. The nuclear control rod according to claim 2, in which the open pores of the interface joint have a volume between 30% and 95% of the total volume of the interface joint as produced in fabrication.

4. The nuclear control rod according to claim 3, in which the open pores of the interface joint have a volume between 50% and 85% of the total volume of the interface joint as produced in fabrication.

5. The nuclear control rod according to claim 1, in which the thickness of the interface joint in its section transverse to the (XX') direction is more than at least 10% of the radius of the pellets.

6. The nuclear control rod according to claim 1, in which the interface joint has a volume percentage of fibres between 15 and 50% and the open pores of the interface joint have a volume between 50% and 85% of the total volume of the interface joint as produced in fabrication.

7. The nuclear control rod according to claim 1, for a gas-cooled fast reactor (GFR), in which the basic material of the cladding is a refractory ceramic matrix composite (CMC) and the absorber pellets are made of $B_4C$.

8. The nuclear control rod according to claim 1, for a sodium-cooled fast reactor (SFR), in which the cladding is made of a metallic material, and the absorber pellets are made of $B_4C$.

9. The nuclear control rod according to claim 1, for Pressurized Water Reactors (PWR), or Boiling Water Reactors (BWR) in which the cladding comprises a refractory ceramic matrix composite CMC material and the absorber pellets are made of $B_4C$.

10. Nuclear absorber assembly comprising a plurality of the nuclear control rods according to claim 1, and arranged to form a lattice.

11. A control rod according to claim 7, wherein the refractory ceramic matrix composite is $SiC-SiC_F$.

* * * * *